(12) United States Patent
MacKinnon et al.

(10) Patent No.: US 7,824,821 B2
(45) Date of Patent: Nov. 2, 2010

(54) FUEL CELL METALLIC SEPARATOR

(75) Inventors: Sean M. MacKinnon, Burnaby (CA);
Lynn C. Erickson, Vancouver (CA);
Ayesha Rashid, Vancouver (CA);
Christopher T. Kirby, Burlington (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 1236 days.

(21) Appl. No.: 11/024,047

(22) Filed: Dec. 28, 2004

(65) Prior Publication Data
US 2006/0141318 A1    Jun. 29, 2006

(51) Int. Cl.
*H01M 8/00* (2006.01)
*H01M 8/02* (2006.01)

(52) U.S. Cl. ............... 429/508; 429/458; 429/461; 429/507

(58) Field of Classification Search ............... 429/34–36
See application file for complete search history.

(56) References Cited

U.S. PATENT DOCUMENTS

| | | | |
|---|---|---|---|
| 6,136,412 A * | 10/2000 | Spiewak et al. | ............ 428/143 |
| 6,694,045 B2 | 2/2004 | Chung | |
| 2002/0102453 A1 * | 8/2002 | Suenaga et al. | ............ 429/37 |
| 2003/0026462 A1 | 2/2003 | Chung | |
| 2003/0034393 A1 | 2/2003 | Chung | |
| 2003/0136835 A1 | 7/2003 | Chung | |
| 2003/0143451 A1 * | 7/2003 | Andou et al. | ............ 429/34 |
| 2003/0173404 A1 | 9/2003 | Chung | |
| 2004/0023090 A1 * | 2/2004 | Pearson et al. | ............ 429/30 |
| 2004/0046021 A1 | 3/2004 | Chung | |

FOREIGN PATENT DOCUMENTS

JP    2004-039436    2/2004

* cited by examiner

*Primary Examiner*—Dah-Wei D Yuan
*Assistant Examiner*—Steven Scully
(74) *Attorney, Agent, or Firm*—Crowell & Moring LLP

(57) ABSTRACT

The invention provides a fuel cell metallic separator, wherein the metallic plate's edges include a resin portion comprising the communication ports. The resin portion around the communication ports is shaped so as to be capable of interlocking with a fuel cell stack component adjacently located in a fuel cell system. The invention also provides a resin portion capable of press fitting or thermal bonding with adjacent a fuel cell stack components.

15 Claims, 5 Drawing Sheets

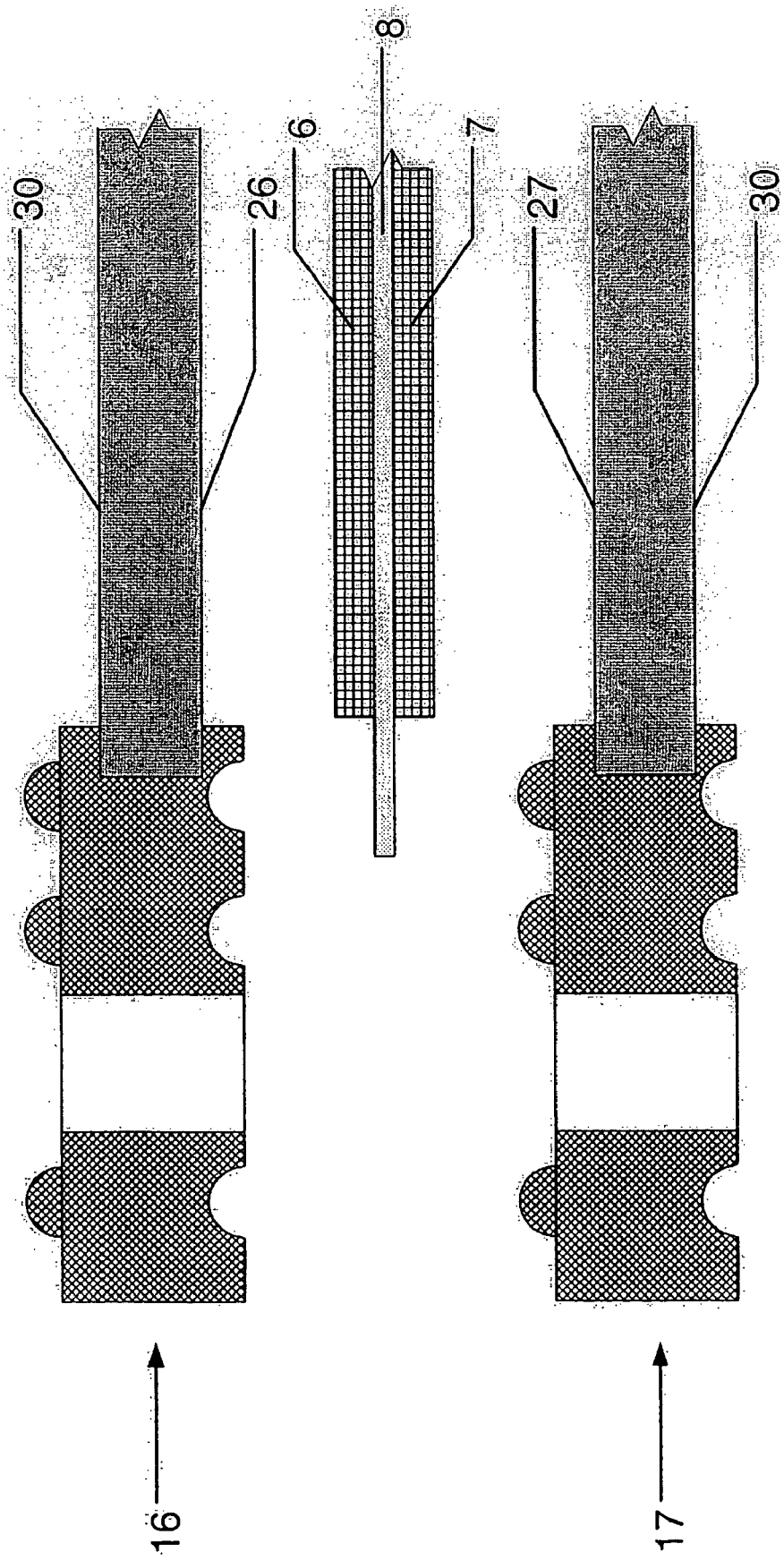

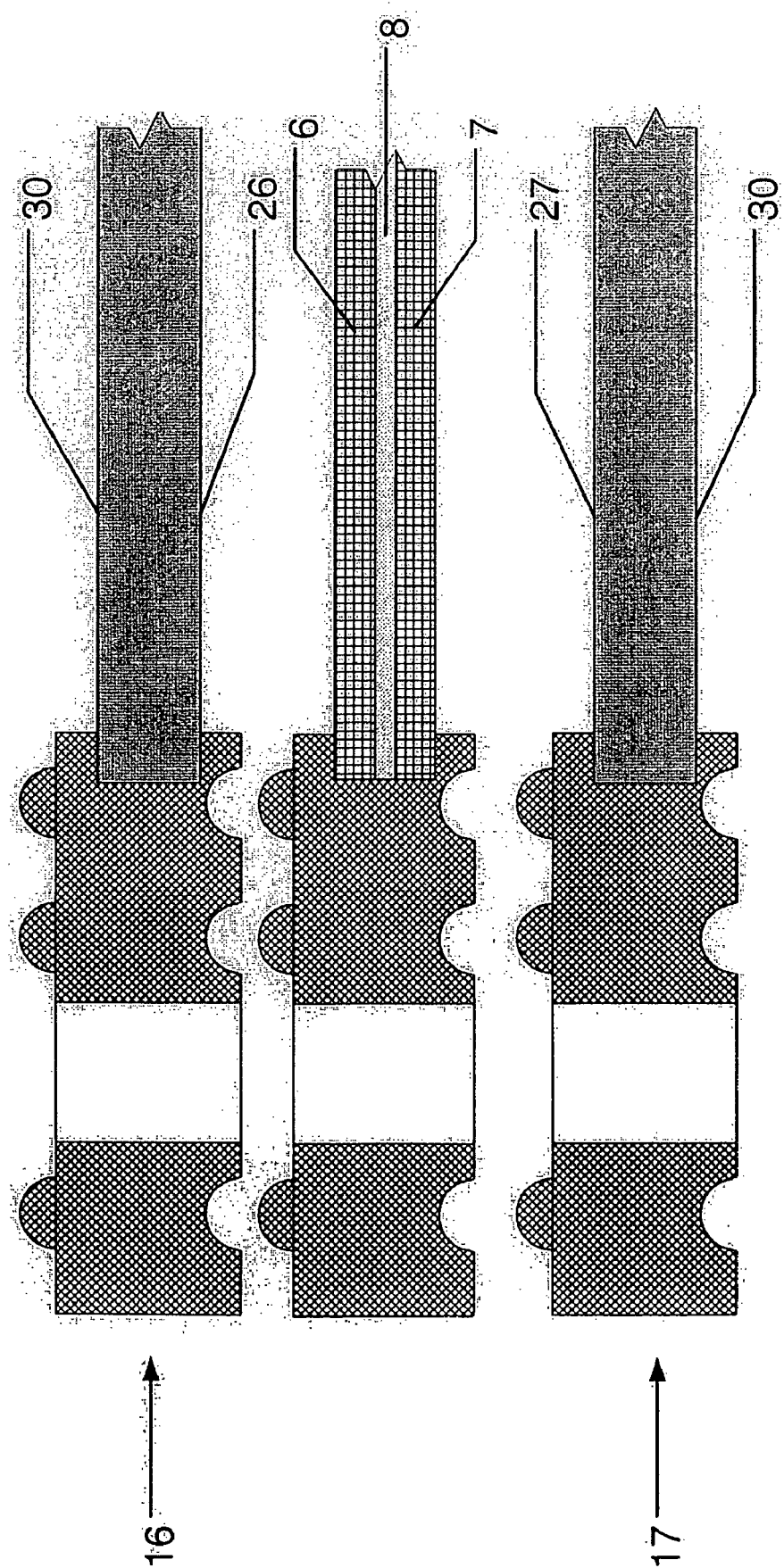

FUEL CELL METALLIC SEPARATOR

BACKGROUND OF THE INVENTION

1. Field of the Invention

The present invention generally relates to fuel cell metallic separators and to methods for manufacturing such separators.

2. Description of the Related Art

Electrochemical fuel cell assemblies convert reactants, namely fuel and oxidant, to generate electric power and reaction products. Electrochemical fuel cell assemblies generally employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

Solid polymer fuel cell assemblies typically employ a membrane electrode assembly ("MEA") consisting of a solid polymer electrolyte, or ion exchange membrane, disposed between two electrode layers. The membrane, in addition to being an ion conductive (typically proton conductive) material, also acts as a barrier for isolating the reactant (i.e., fuel and oxidant) streams from each other.

The MEA is typically interposed between two separator plates, which are substantially impermeable to the reactant fluid streams, to form a fuel cell assembly. The plates act as current collectors, provide support for the adjacent electrodes, and typically contain flow field channels for supplying reactants to the MEA or for circulating coolant. The plates are typically known as flow field plates. The fuel cell assembly is typically compressed to ensure good electrical contact between the plates and the electrodes, as well as good sealing between fuel cell components. A plurality of fuel cell assemblies may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies. Such plates are also referred to as bipolar plates and may have flow channels for directing fuel and oxidant, or a reactant and coolant, on each major surface, respectively.

Corrosion of metallic separator plates, more specifically around the communication ports for the fluid streams, is a concern in the operation of fuel cell systems. The concern is the occurrence of a liquid short-circuit at the edges of the ports between adjacent fluid stream and the resultant electrolytic corrosion.

One way to address this concern has been through port coating, so as to provide a barrier between the liquid streams and the metallic plates. The coating solution must be electrolytically and hydrolytically stable and have a very low permeability to water vapor. However, the selection of the proper coating material has proven to be a challenge as such material must also be suitable for the high temperature and the high relative humidity environment of fuel cell systems.

Another way to address this concern is as outlined in U.S. Patent Application 2003-0143451 and Japan Patent Application 2004-039436. According to these disclosures, the edges of the metallic separators, including the communication ports, are made of thermoplastic resin and the port seals are made of silicone rubber. The method for manufacturing these plates, however, is complicated injection molding processes, as the elastomeric seals must form part of a separate step from the initial resin-forming step.

There is therefore a need for metallic separator plates which are not prone to electrolytic corrosion and which are easy to manufacture. The present invention addresses these and other needs, and provides further related advantages.

BRIEF SUMMARY OF THE INVENTION

The invention provides a fuel cell metallic separator comprising a metallic plate and a resin portion. The resin portion is made of a resin integrally formed on said metallic plate in such a manner as to overlap part of edge portions of the metallic plate and as to comprise one communication port. The resin portion around the communication port is shaped so as to be capable of interlocking with a resin portion of a fuel cell stack component adjacently located in a fuel cell system.

In one embodiment of the invention, the shape of the resin portion around the communication port comprises a projection on one side of the metallic separator and a mating recess on the opposite side of the metallic separator, wherein the projection and the recess provides an interlocking connection between fuel cell stack components adjacently located in a fuel cell system. In such an embodiment, the resin portion may be made of materials that are essentially free of silicon.

In another embodiment of the invention, the resin portion may be adapted so as to be capable of thermally bonding with a fuel cell stack component adjacently located in a fuel cell system. In such an embodiment, the resin portion may be made of thermoplastic resin or thermosetting epoxy.

In another embodiment, the resin portion may be adapted so as to be capable of press fitting with a fuel cell stack component adjacently located in a fuel cell system. In such an embodiment, the resin portion may be made of solid rubber.

The invention also provides fuel cell stack components where, instead of overlapping edge portion of metallic plates, the resin portion overlaps edge portion of grafoil flow field plates or membrane electrode assemblies.

Specific details of certain embodiment(s) of the present apparatus/method are set forth in the detailed description below and illustrated in the enclosed Figures to provide an understanding of such embodiment(s). Persons skilled in the technology involved here will understand, however, that the present apparatus/method has additional embodiments, and/or may be practiced without at least some of the details set forth in the following description of preferred embodiment(s).

BRIEF DESCRIPTION OF THE DRAWINGS

FIGS. 3A and 3B are sectional views of embodiments of unit cells pursuant to the invention.

DETAILED DESCRIPTION OF THE INVENTION

Many specific details of certain embodiments of the invention are set forth in the detailed description below, and illustrated in enclosed FIGS. 1 and 2, to provide a thorough understanding of such embodiments. One skilled in the art, however, will understand that the present invention may have additional embodiments, or may be practiced without several of the details described.

Figure 1:
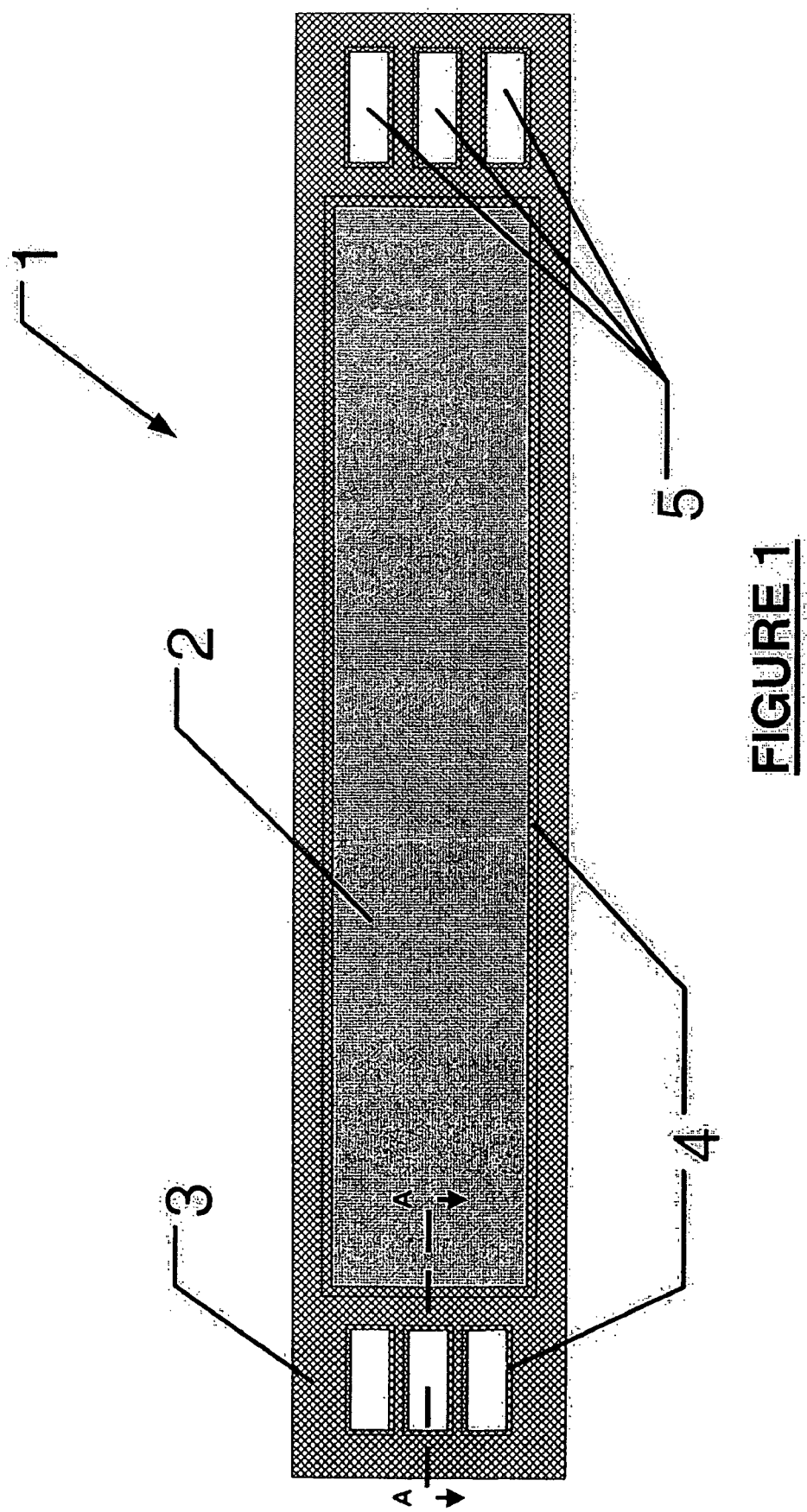
FIG. 1 is a plan view of a fuel cell metallic separator pursuant to the invention.

An embodiment of a fuel cell metallic separator pursuant to the invention is shown at FIG. 1. Fuel cell metallic separator 1 comprises a resin portion 3 integrally formed on edge portions of a metallic plate 2. Communication ports 5 are provided in resin portion 3 for allowing fuel, oxidant and coolant of a fuel cell to pass therethrough, and a rib portion 4 is provided on metallic plate 2 and resin portion 3 as an airtight seal. Rib portion 4 is described in more details below.

Fuel cell metallic separator 1 according to the invention is such as to constitute a partition wall between single cells of a fuel cell stack and to isolate from one another the fuel, oxidant and coolant streams. This is accomplished by having rib portion 4 disposed around, for example, as shown in FIG. 1, the peripheral portions of communication ports 5 and around metallic plate 2. Furthermore, rib portion 4 also seals and joins together adjacent fuel cell components of a fuel cell stack. This is accomplished by having rib portion 4 shaped so as to be capable of interlocking with rib portion 4 of another rib portion of a component adjacently located in a fuel cell stack. Details of a unit cell assembly pursuant to this invention is outlined in more details below with reference to FIGS. 3A-3B.

Figure 2:
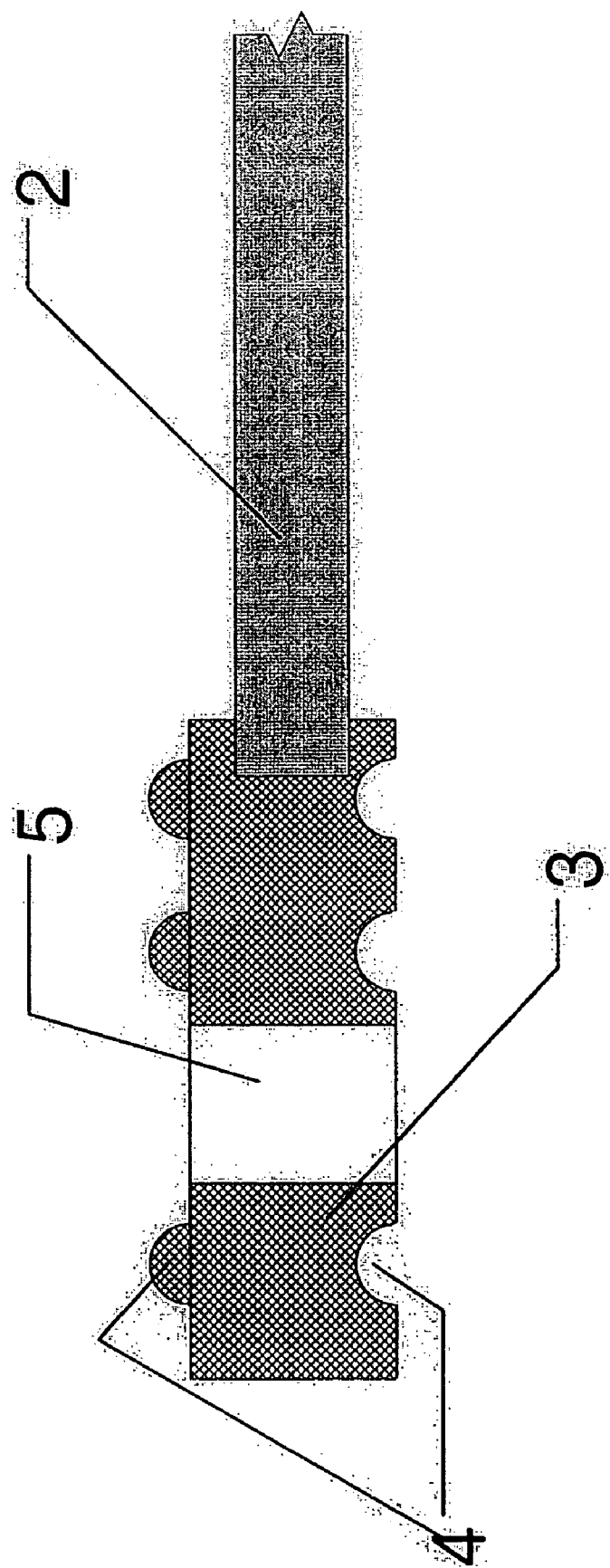
FIG. 2 is a sectional view of the fuel cell metallic separator of FIG. 1 taken along line A-A.

Referring to FIG. 2, this is accomplished in one embodiment of the invention by having the shape of rib portion 4 (around communication port 5, shown in FIG. 2, but also around metallic plate 2, not shown in FIG. 2) be a mating projection and recess adapted to provide an interlocking connection between metallic separators 1 adjacently located in a fuel cell stack. In FIG. 2, half circles are the shape of choice, but it is understood that any interlocking shape is possible pursuant to the invention.

Contrary to the metallic separator disclosed in US Patent Application 2003/0143451, rib portion 4 is of the same material as the remainder of resin portion 3 and can therefore be formed in one single step.

Pursuant to the invention, there is no specific limitation to resin 3/rib 4 portion materials provided it can meet all operational requirements of a fuel cell system environment (gas impermeability, heat resistance and durability). For example, to resin 3/rib 4 portion of fuel cell metallic separator 1 needs to be impermeable to the fuel, oxidant gas and the various types of coolants (including cooling water) found in fuel cell systems, as well as being resistant to such system's operating temperatures (typically from −40° C. to 120° C.) and humidity environment. Acid resistance and stability to the coolant stream is another requirement of resin 3/rib 4 portion material. Also, resin 3/rib 4 portion material needs to have a suitable fluidity at a predetermined temperature so that it can be formed into a desired shape when resin 3/rib 4 portion is formed integrally with metallic plate 2 through injection or compression molding. Also, resin 3/rib 4 portion material needs to be provided with a certain flexibility which allows it to follow the expansion or contraction of metallic plate 2 so as not to be separated from metallic plate 2 while the fuel cell is in use.

Furthermore, pursuant to the invention, appropriate adhesion between rib portions 4 of adjacent fuel cell stack components must be attained. In one embodiment, this can be achieved with thermal bonding, through the use of localized heating methods such as the use of lasers. In such an embodiment, a suitable resin 3/rib 4 portion material, such as a melt processable thermoplastic polymer or thermoplastic elastomer, is necessary. The manufacturing method for such an embodiment is preferably an injection molding process. In another embodiment, the necessary adhesion can be achieved with press or snap fitting. A suitable resin 3/rib 4 portion material in such an embodiment can be solid rubbers, such as Ethylene-Propylene Diene Monomer (EPDM) and Butyl Nitrile. The manufacturing method for such an embodiment is preferably a compression molding process.

Beside the single step manufacturing process that it allows, another advantage of this invention over the one disclosed in U.S. Patent Application 2003/0143451 is the absence of silicone material. Silica contamination is a recurrent problem in fuel cell system operations. The invention also improves power density by removing relief structures and minimizing the plate-to-plate thickness.

FIGS. 3A and 3B are sectional views of embodiments of unit cells pursuant to the invention. FIG. 3A shows an MEA comprising a cathode 6, an anode 7 and a solid electrolyte 8 interposed therebetween. The MEA is interposed between a fuel flow field plate 17 and an oxidant flow field plate 16, both plates being embodiments of the invention. Fuel flow field plate 17 comprises fuel flow channels 27 on one side and coolant flow channels 30 on the other side. Oxidant flow field plate 16 comprises oxidant flow channels 26 on one side and coolant flow channels 30 on the other side. In this embodiment of the invention, rib portion 4 seals and joins together adjacent fuel cell metallic separators of a fuel cell stack, either directly in the case of adjacent unit cells or after pinching solid electrolyte 8 of an MEA in the case of a unit cell. FIG. 3B shows a flush-cut MEA which is resin encapsulated according to the invention. In this embodiment of the invention, rib portion 4 seals and joins together adjacent fuel cell metallic separators only in the case of adjacent unit cells, i.e., when the joining of such plates creates cooling channels. When sealing and joining MEAs to plates, the rib portions of the respective parts effect the required connection.

Figure 3C:
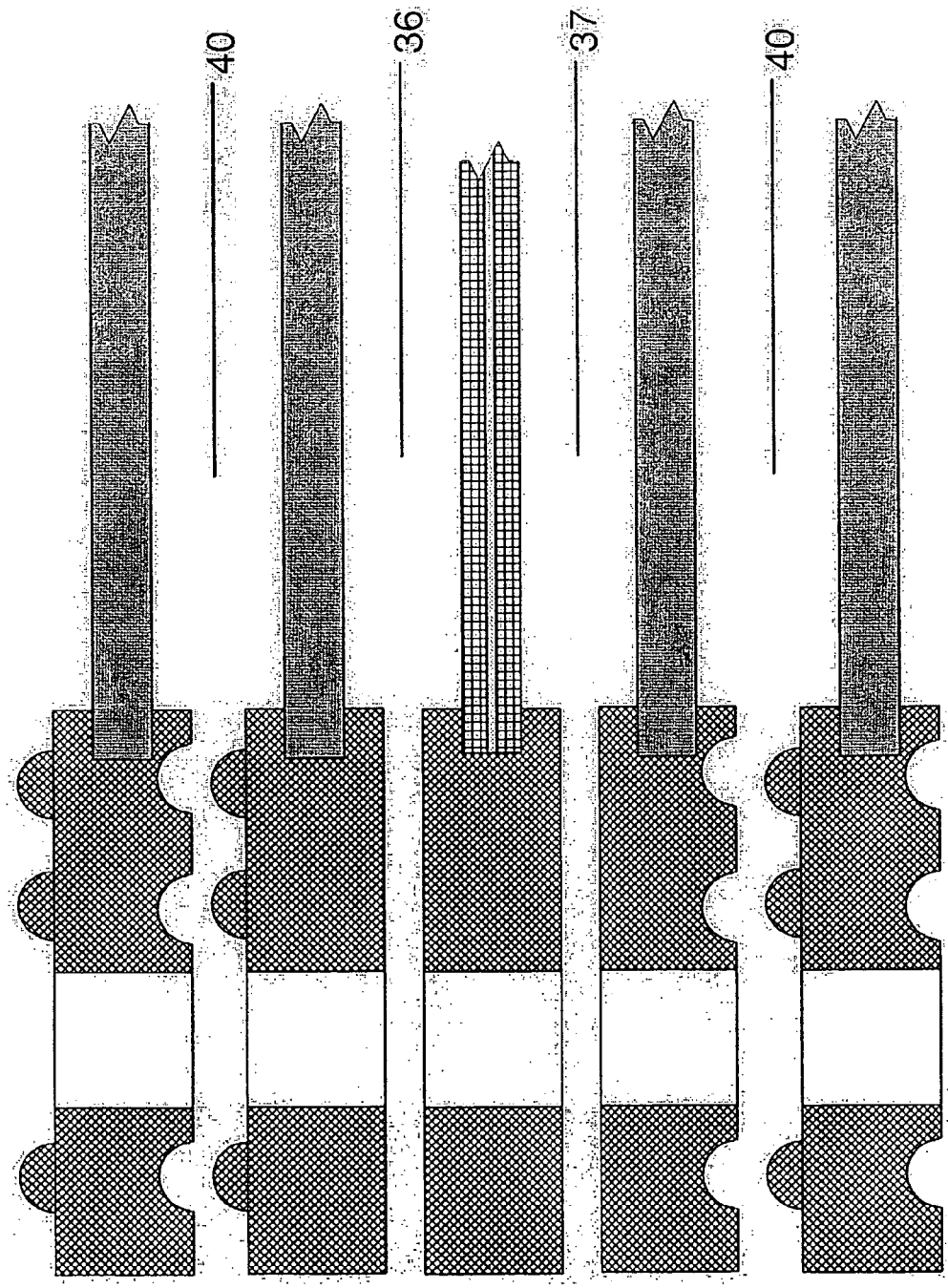
FIG. 3C is a sectional view of a portion of a fuel cell stack pursuant to the invention.

From the foregoing it will be appreciated that, although specific embodiments of the invention have been described herein for purposes of illustration, various modifications may be made without deviating from the spirit and scope of the invention. For example, this invention can be applied to other plate materials such as grafoil. In such plates, the invention is not applied for its port corrosion reduction capability, as such problems are mainly restricted to metal plates. However, the use of this invention to plate materials such as grafoil still benefits for the power density advantage outlined previously. Also, this invention does not dictate that all components of a fuel cell stack by encapsulated with matching projections and recesses as outlined above. Indeed, it is possible to have adjacent plates joined together with matching projections and recesses, while MEAs are joined with plates without matching projections and recesses (as shown in FIG. 3C). In such an embodiment, when adjacent plates are joined, coolant flow fields 40 are formed, while oxidant flow fields 36 and fuel flow fields 37 are formed when plates and MEAs are joined to plates. Accordingly, the invention is not limited except as by the appended claims.

What is claimed is:

1. A fuel cell separator, comprising:
   a metallic plate;
   a first resin member integrally formed on, and extending laterally outward about, the entire periphery of said metallic plate, said first resin member overlapping and forming a seal with peripheral edges of the metallic plate; and
   at least one fluid communication port formed in said first resin member; wherein
   said first resin member, in an area surrounding the at least one fluid communication port, is formed with a surface configuration that is engageable with a corresponding surface configuration of a second resin member that is part of a fuel cell stack component adjacently located in a fuel cell stack; and said surface configuration comprises at least a projecting rib portion that is made of the same material as the first resin member, and is formed integrally therewith.

2. The fuel cell metallic separator of claim 1, wherein:

said surface configuration comprises said at least a projecting rib portion on one side of the metallic separator, and at least a mating recess on the opposite side of the metallic separator; and the at least a projecting rib and the at least a mating recess provide an interlocking connection between fuel cell stack components adjacently located in a fuel cell stack.

3. The fuel cell metallic separator of claim 1, wherein the first resin member is adapted for thermal bonding with a fuel cell stack component adjacently located in a fuel cell stack.

4. The fuel cell metallic separator of claim 2, wherein the first resin member is adapted for thermal bonding with a fuel cell stack component adjacently located in a fuel cell stack.

5. The fuel cell metallic separator of claim 1, wherein the first resin member is adapted for press fitting with a fuel cell stack component adjacently located in a fuel cell stack.

6. The fuel cell metallic separator of claim 2, wherein the first resin member is adapted for press fitting with a fuel cell stack component adjacently located in a fuel cell stack.

7. The fuel cell metallic separator of claim 1, wherein the resin member is made of materials that are substantially free of silicon.

8. The fuel cell metallic separator of claim 2, wherein the first resin member is made of materials that are substantially free of silicon.

9. The fuel cell metallic separator of claim 3, wherein the first resin member is made of material selected from the group of materials consisting of thermoplastic resin and thermosetting epoxies.

10. The fuel cell metallic separator of claim 4, wherein the first resin member is made of material selected from the group of materials consisting of thermoplastic resin and thermosetting epoxies.

11. The fuel cell metallic separator of claim 5, wherein the first resin member is made of solid rubber.

12. The fuel cell metallic separator of claim 6, wherein the first resin member is made of solid rubber.

13. A fuel cell separator, comprising:

a metallic plate;

a resin member integrally formed on, and extending lateral outward about, the entire periphery of said metallic plate, said resin member overlapping and forming a seal with peripheral edges of the metallic plate;

at least one fluid communication port formed in said resin member;

a sealing component disposed on a surface of said resin member, said sealing component surrounding said communication port, and having a configuration that is engageable with a complementarily configured sealing feature of an adjacent fuel cell stack component in a fuel cell stack;

wherein, said sealing component is molded as a surface feature and an integral part of the resin which forms the resin member.

14. The fuel cell separator according to claim 1, wherein said at least one fluid communication port is formed in a portion of said first resin member that extends laterally outward from the periphery of said metallic plate.

15. The fuel cell separator according to claim 13, wherein said at least one fluid communication port is formed in a portion of said resin member that extends laterally outward from the periphery of said metallic plate.

\* \* \* \* \*